United States Patent
Taniguchi et al.

(10) Patent No.: US 7,528,199 B2
(45) Date of Patent: May 5, 2009

(54) CONJUGATED-DIOLEFIN (CO)POLYMER RUBBER AND PROCESS FOR PRODUCING THE SAME

(75) Inventors: Kouta Taniguchi, Tokyo (JP); Keisuke Tsukimawashi, Tokyo (JP); Naokazu Kobayashi, Tokyo (JP); Toshihiro Tadaki, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 10/567,905

(22) PCT Filed: Mar. 14, 2005

(86) PCT No.: PCT/JP2005/004416

§ 371 (c)(1),
(2), (4) Date: Dec. 1, 2006

(87) PCT Pub. No.: WO2005/087814

PCT Pub. Date: Sep. 22, 2005

(65) Prior Publication Data

US 2007/0088132 A1 Apr. 19, 2007

(30) Foreign Application Priority Data

Mar. 15, 2004 (JP) ............................ 2004-071898

(51) Int. Cl.
  *C08C 19/25* (2006.01)
  *C08F 236/04* (2006.01)
  *C08F 236/10* (2006.01)
(52) U.S. Cl. ................. 525/342; 525/331.9; 525/333.1; 525/333.2
(58) Field of Classification Search ............. 525/331.9, 525/333.1, 333.2, 342
See application file for complete search history.

(56) References Cited

U.S. PATENT DOCUMENTS

2001/0009948 A1 * 7/2001 Hopkins et al. .......... 525/330.7

FOREIGN PATENT DOCUMENTS

| JP | 1-185304 | 7/1989 |
| JP | 7-233216 | 9/1995 |
| JP | 2001-158837 | 6/2001 |
| JP | 2003-171418 | 6/2003 |

OTHER PUBLICATIONS

U.S. Appl. No. 10/591,279, filed Aug. 31, 2006, Kobayashi et al.
U.S. Appl. No. 10/567,905, filed Feb. 10, 2006, Taniguchi et al.

* cited by examiner

*Primary Examiner*—Roberto Rábago
(74) *Attorney, Agent, or Firm*—Oblon, Spivak, McClelland, Maier & Neustadt, P.C.

(57) ABSTRACT

A method for producing an alkoxysilyl group-containing conjugated diolefin (co)polymer rubber by polymerizing a conjugated diolefin or a conjugated diolefin and an aromatic vinyl compound in a hydrocarbon solvent by anionic polymerization using as an initiator at least one metal compound selected from an organic alkali metal compound and an organic alkali earth metal compound, and then allowing an alkoxysilane-based compound to react, wherein after the alkoxysilane-based compound has been allowed to react, an alkaline compound is added at the time of desolvation, and treatment is conducted at a pH of 8 to 12.

13 Claims, No Drawings

CONJUGATED-DIOLEFIN (CO)POLYMER RUBBER AND PROCESS FOR PRODUCING THE SAME

TECHNICAL FIELD

The present invention relates to a conjugated diolefin (co)polymer rubber which is small in variations in the Mooney viscosity of a resulting rubber, and small in changes in the Mooney viscosity with the elapse of time and method for producing the same.

BACKGROUND ART

There is generally known a method of polymerizing a conjugated diolefin alone or an aromatic vinyl compound therewith in the presence of an anionic polymerization initiator, and coupling the resulting living polymer using a silicon halide compound such as tetrachlorosilane as a coupling agent to produce a branched conjugated diolefin (co)polymer rubber useful for automobile tires etc. However, such a coupling agent contains a halogen atom as a reactive site, and produces a halogen-containing compound such as LiCl as a by-product after the coupling reaction. On the other hand, it has been desired that a halide existing in a rubber is reduced.

For this purpose, various coupling agents of the non-halogen family have been proposed. For example, JP-A-7-2958 proposes a method for producing a conjugated diene-based polymer having a specific branched structure, using an alkoxysilane as the coupling agent.

However, when the alkoxysilane is used as the coupling agent, the resulting branched conjugated diolefin (co)polymer rubber has the problem not observed in the coupling reaction with a conventional polysilicon halide compound that a polymer component having a structure other than a desired branched structure is formed with the elapse of time because of hydrolysis and condensation of alkoxysilyl group.

In order to solve this problem, JP-A-10-25313 proposes a method of polymerizing a conjugated diene-based monomer using an organic lithium compound as an initiator in a hydrocarbon solvent to produce a living polymer, and coupling it using an alkoxysilane compound, followed by treatment by the addition of at least one kind of Lewis base selected from a tertiary diamine, a chain ether having two or more oxygen atoms in one molecule or a cyclic ether to the above-mentioned hydrocarbon solvent, as a method for producing a halogen-free branched conjugated diene-based polymer effectively and stably.

However, also in this method, there are variations in the Mooney viscosity of the resulting polymer, and it is difficult to restrain changes in the Mooney viscosity of the polymer with the elapse of time.

Patent Document: JP-A-7-2958
Patent Document: JP-A-10-25313

DISCLOSURE OF THE INVENTION

Objects that the Invention are to Solve

Objects of the present invention are to provide a conjugated diolefin (co)polymer rubber having an alkoxysilyl group which is small in variations in the Mooney viscosity of the rubber and can be stably produced, and in which later changes in the Mooney viscosity with the elapse of time can also be restrained, and a method for producing the same.

Means for Solving the Problem

The present invention relates to a conjugated diolefin (co)polymer rubber obtained from a conjugated diolefin or a conjugated diolefin and an aromatic vinyl compound, which is characterized in that the (co)polymer rubber has an alkoxysilyl group and has been desolvated under alkaline conditions.

It is preferred that the conjugated diolefin (co)polymer rubber of the present invention is one further having an amino group.

The amino group as used herein is preferably a primary amino group.

A compound for preferably allowing the above-mentioned amino group and alkoxysilyl group to be bonded to a (co)polymer chain is preferably an amino group-containing alkoxy-silane-based compound.

Next, the present invention relates to a method for producing an alkoxysilyl group-containing conjugated diolefin (co)polymer rubber comprising polymerizing a conjugated diolefin or a conjugated diolefin and an aromatic vinyl compound in a hydrocarbon solvent by anionic polymerization using as an initiator at least one metal compound selected from the group consisting of an organic alkali metal compound and an organic alkali earth metal, compound and then allowing an alkoxysilane-based compound to react, in which the method is characterized in that after the alkoxysilane-based compound has been allowed to react, an alkaline compound is added at the time of desolvation, and treatment is conducted at a pH of 8 to 12.

The above-mentioned alkaline compounds include at least one selected from the group consisting of ammonia, sodium hydroxide, potassium hydroxide and lithium hydroxide.

Advantages of the Invention

The present invention has the effect of being able to provide an alkoxysilyl group-containing conjugated diolefin (co)polymer rubber which can be stably produced with small variations in the Mooney viscosity and is restrained in later changes in the Mooney viscosity with the elapse of time.

Accordingly, the conjugated diolefin (co)polymer rubber of the present invention ensures quality stability particularly even when stored for a long period of time, improves a balance of tan $\delta$ (0° C.) /tan $\delta$ (70° C.) at the time when used in a compounded rubber vulcanizate, and is also excellent in wear resistance.

BEST MODE FOR CARRYING OUT THE INVENTION

The alkoxysilyl group-containing conjugated diolefin (co)polymer rubber of the present invention is obtained by reacting a conjugated diolefin (co)polymer rubber obtained from a conjugated diolefin or a conjugated diolefin and an aromatic vinyl compound with an alkoxysilane-based compound, and then, performing desolvation under alkaline conditions.

According to the production method of the present invention, the conjugated diolefin or the conjugated diolefin and the aromatic vinyl compound (a copolymerizable third monomer in some cases) are polymerized in a hydrocarbon solvent by anionic polymerization using an organic alkali metal compound and/or an alkali earth metal compound as an initiator, and the alkoxysilane-based compound is reacted with a polymerization active terminal at the time when the polymerization has been substantially completed to introduce the alkoxysilyl group into a (co)polymer chain.

In the present invention, an alkaline compound is added at the time of desolvation such as steam stripping after the polymerization has been completed, and the conjugated diolefin (co)polymer rubber is treated under alkaline conditions of pH 8 to 12. This restrains hydrolysis of the alkoxysilyl group bonded to the (co)polymer chain, so that variations in the Mooney viscosity of the resulting (co)polymer rubber can be restrained, and changes in the Mooney viscosity of the (co)polymer rubber with the elapse of time can be restrained.

The polymerization reaction is usually conducted at a polymerization temperature ranging from 0 to 120° C. for a polymerization time ranging from 1 to 120 minutes, under constant temperature conditions or elevating temperature conditions. Further, the polymerization may be either a batch type or continuous polymerization.

The hydrocarbon solvents used in polymerizing the (co) polymer rubber of the present invention include, for example, pentane, hexane, heptane, octane, methylcyclopentane, cyclohexane, benzene, toluene, xylene and the like. Of these, cyclohexane and heptane are preferred. The hydrocarbon solvent is used in such an amount as to give a total monomer concentration of usually 5 to 30% by weight, preferably about 10 to about 20% by weight.

On the other hand, as the conjugated diolefin used in the production of the conjugated diolefin (co)polymer rubber of the present invention, there is preferably used, for example, 1,3-butadiene, isoprene, 2,3-dimethyl-1,3-butadiene, 2-chloro-1,3-butadiene, 1,3-pentadiene, a mixture thereof or the like.

The amount of the conjugated diolefin used is usually from 40 to 100% by weight, and preferably from 50 to 95% by weight, based on all monomers. Less than 40% by weight results in an increase in hysteresis loss.

Further, the aromatic vinyl compounds include, for example, styrene, 2-methylstyrene, 3-methylstyrene, 4-methylstyrene, α-methylstyrene, 2,4-dimethylstyrene, 2,4-diisopropylstyrene, 4-tert-butylstyrene, divinylbenzene, tert-butoxystyrene, vinylbenzyldimethylamine, (4-vinyl-benzyl)dimethylaminoethyl ether, N,N-dimethylaminoethyl-styrene, 2-t-butylstyrene, 3-t-butylstyrene, 4-t-butyl-styrene, vinylpyridine, a mixture thereof and the like. Of these, styrene is particularly preferred.

The amount of the aromatic vinyl compound used is usually 60% by weight or less, and preferably from 50 to 5% by weight, based on all monomers.

Further, the copolymerizable third monomers used in some cases include, for example, acrylonitrile, methyl methacrylate, ethyl methacrylate, methyl acrylate, ethyl acrylate, hydroxy-ethyl methacrylate and hydroxyethyl acrylate.

The amount of the third monomer used is usually less than 25% by weight, preferably 15% by weight or less, and more preferably 10% by weight or less, based on all monomers.

Furthermore, examples of the initiators of the organic alkali metal compounds and organic alkali earth metal compounds used in the polymerization include alkyllithiums such as n-butyllithium, sec-butyllithium and t-butyllithium, alkylenedilithiums such as 1,4-dilithiobutane, phenyllithium, stilbenelithium, lithiumnaphthalene, sodiumnaphthalene, potassiumnaphthalene, n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, diethylaminobarium and barium stearate.

The amount of the initiator used is from 0.002 to 0.1 mmol, and preferably from 0.005 to 0.03 mmol, converted to the alkali metal atom or the alkali earth metal atom, per g of all monomer components.

The organic alkali metal compound as the above-mentioned initiator can be used in the copolymerization of the conjugated diolefin and the aromatic vinyl compound as a reaction product with a secondary amine compound or a tertiary amine compound. As the organic alkali metal compound allowed to react with the above-mentioned secondary amine compound or tertiary amine compound, an organic lithium compound is preferred. More preferably, n-butyllithium, sec-butyllithium or t-butyllithium is used.

Examples of the secondary amine compounds allowed to react with the organic alkali metal compound include dimethylamine, diethylamine, dipropylamine, di-n-butylamine, di-sec-butylamine, dipentylamine, dihexylamine, di-n-octylamine, di-(2-ethylhexyl)amine, dicyclohexylamine, N-methylbenzylamine, diallylamine, morpholine, piperazine, 2,6-dimethyl-morpholine, 2,6-dimethylpiperazine, 1-ethylpiperazine, 2-methylpiperazine, 1-benzylpiperazine, piperidine, 3,3-dimethylpiperidine, 2,6-dimethylpiperidine, 1-methyl-4-(methyl-amino)piperidine, 2,2,6,6-tetramethylpiperidine, pyrrolidine, 2,5-dimethylpyrrolidine, azetidine, hexamethyleneimine, heptamethyleneimine, 5-benzyloxyindole, 3-azaspiro[5,5]-undecane, 3-azabicyclo[3.2.2]nonane, carbazole and the like.

Further, examples of the tertiary amine compounds allowed to react with the organic alkali metal include N,N-dimethyl-o-toluidine, N,N-dimethyl-p-toluidine, N,N-dimethyl-m-toluidine, α-picoline, β-picoline, γ-picoline, benzyldimethylamine, benzyldiethylamine, benzyldipropylamine, benzyldibutylamine, (o-methylbenzyl)dimethylamine, (m-methylbenzyl)dimethylamine, (p-methylbenzyl)dimethylamine, N,N-tetramethylene-o-toluidine, N,N-heptamethylene-o-toluidine, N,N-hexamethylene-o-toluidine, N,N-trimethylene-benzylamine, N,N-tetramethylenebenzylamine, N,N-hexamethylenebenzylamine, N,N-tetramethylene(o-methylbenzyl)-amine, N,N-tetramethylene(p-methylbenzyl)amine, N,N-hexamethylene(o-methylbenzyl)amine N,N-hexamethylene(p-methyl-benzyl)amine and the like.

In the polymerization, an ether compound such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, tetrahydrofuran, 2,2-(bis-tetrahydrofurfuryl)propane, bistetrahydrofurfuryl formal, a methyl ether of tetrahydrofurfuryl alcohol, an ethyl ether of tetrahydrofurfuryl alcohol, a butyl ether of tetrahydrofurfuryl alcohol, α-methoxytetrahydrofuran, dimethoxybenzene or dimethoxyethane and/or a tertiary amine compound such as triethylamine, pyridine, N,N,N',N'-tetramethylethylene-diamine, dipiperidinoethane, a methyl ether of N,N-diethylethanolamine, an ethyl ether of N,N-diethylethanolamine or a butyl ether of N,N-diethylethanolamine can be added to a polymerization system to adjust a microstructure (vinyl bond content) of a conjugated diolefin moiety of the conjugated diolefin (co)polymer rubber, as needed.

When the reactivity of the initiator used in the present invention is intended to be improved, or when the aromatic vinyl compound introduced into the polymer is intended to be randomly arranged or a single chain of the aromatic vinyl compound is intended to be given, a potassium compound may be added together with the initiator. As the potassium compound added together with the initiator, there is used, for example, a potassium alkoxide or potassium phenoxide represented by potassium isopropoxide, potassium t-butoxide, potassium t-amyloxide, potassium n-heptaoxide, potassium benzyloxide or potassium phenoxide; a potassium salt of isovaleric acid, capric acid, lauric acid, palmitic acid, stearic acid, oleic acid, linolenic acid, benzoic acid, phthalic acid or 2-ethylhexanoic acid; a potassium salt of an organic sulfonic acid such as dodecylbenzenesulfonic acid, tetradecylbenzenesulfonic acid, hexadecylbenzenesulfonic acid or octadecylbenzenesulfonic acid; a potassium salt of an organic phosphorous acid partial ester such as diethyl phosphite, diisopropyl phosphite, diphenyl phosphite, dibutyl phosphite or dilauryl phosphite; or the like.

These potassium compounds can be added in an amount of 0.005 to 0.5 mole per gram atomic equivalent of alkali metal or alkali earth metal of initiator. Less than 0.005 mole results in no appearance of the effect of adding the potassium compound (improvement in reactivity of the initiator, randomization of the aromatic vinyl compound or giving of the single chain), whereas exceeding 0.5 mole results in a decrease in polymerization activity to cause productivity to substantially decrease, and in a decrease in modification efficiency at the time when the reaction for modifying a polymer terminal with a functional group is conducted.

In the present invention, the conjugated diolefin or the conjugated diolefin and the aromatic vinyl compound are polymerized by anionic polymerization, and the above-mentioned alkoxysilane-based compound is reacted with a polymerization active terminal thereof, as described above. The reaction is conducted usually at 0 to 120° C., preferably at 50 to 100° C., and the reaction time is from 1 to 30 minutes, and preferably from 5 to 20 minutes.

The alkoxysilane-based compounds used herein in the reaction include, for example, tetramethoxysilane, tetraethoxysilane, tetrapropoxysilane, tetrabutoxysilane, tetraphenoxysilane, tetratoluyloxysilane, methyltrimethoxysilane, methyltriethoxysilane, methyltripropoxysilane, methyltributoxysilane, methyltriphenoxysilane, ethyltrimethoxysilane, ethyltriethoxysilane, ethyltripropoxysilane, ethyltributoxysilane, ethyltriphenoxysilane, dimethyldimethoxysilane, dimethyldiethoxysilane, dimethyldipropoxysilane, dimethyldibutoxy-silane, dimethyldiphenoxysilane, diethyldimethoxysilane, diethyldiethoxysilane, diethyldipropoxysilane, diethyldi-butoxysilane, diethyldiphenoxysilane, vinyltrimethoxysilane, vinyltriethoxysilane, vinyltripropoxysilane, vinyltri-butoxysilane, vinyltriphenoxysilane, allyltriphenoxysilane, octenyltrimethoxysilane, phenyltrimethoxysilane, phenyltriethoxysilane, phenyltripropoxysilane, phenyltributoxysilane, phenyltriphenoxysilane, trimethoxychlorosilane, triethoxy-chlorosilane, tripropoxychlorosilane, tributoxychlorosilane, triphenoxychlorosilane, dimethoxy-dichlorosilane, dipropoxy-dichlorosilane and diphenoxy-dichlorosilane.

Further, as the alkoxysilane-based compound, an amino group-containing alkoxysilane-based compound is preferred in that interaction with a filler is improved.

These amino group-containing alkoxysilane-based compounds include, for example, N,N-bis (trimethylsilyl)amino-propylmethyldimethoxysilane, N,N-bis(trimethylsilyl)amino-propylmethyldiethoxysilane, N,N-bis(trimethylsilyl)amino-propyltrimethoxysilane, N,N-bis(trimethylsilyl)aminopropyltriethoxysilane, N,N-bis(trimethylsilyl)aminoethyltrimethoxysilane, N,N-bis(trimethylsilyl)aminoethyltriethoxy-silane, N,N-bis(trimethylsilyl)aminoethylmethyldimethoxy-silane, N,N-bis(trimethylsilyl)aminoethylmethyldiethoxy-silane, 1-trimethylsilyl-2,2-dimethoxy-1-aza-2-sila-cyclopentane, N,N-diethyl-3-aminopropyltrimethoxysilane, N,N-diethyl-3-aminopropyltriethoxysilane, 2-(triethoxy-silylethyl)pyridine, γ-isocyanatepropyltriethoxysilane and the like.

In particular, an amino group-containing alkoxy-silane-based compound such as-N,N-bis(trimethylsilyl)amino-propylmethyldiethoxysilane (a protective group separates at the time of desolvation to form a primary amino group) which can introduce the primary amino group and the alkoxysilyl group into the (co)polymer chain is preferred as the alkoxysilane-based compound in that interaction with the filler is more improved.

As for the amount of the alkoxysilane-based compound used in the above-mentioned reaction, it can be added in an amount of 0.05 to 5.0 moles, preferably 0.1 to 2.0 moles, per gram atomic equivalent of alkali metal or alkali earth metal of initiator.

In the conjugated diolefin (co)polymer rubber of the present invention, the content of the above-mentioned alkoxysilyl group is usually from 0.1 to 200 mmol/kg of copolymer rubber polymer, preferably from 0.5 to 100 mmol/kg of copolymer rubber polymer, and more preferably from 1 to 50 mmol/kg of copolymer rubber polymer. The kg copolymer rubber polymer as used herein means the weight of 1 kg of polymer not containing an additive such as an antiaging agent which is added in the production or after the production.

The alkoxysilyl group may be bonded to any of a polymerization initiating terminal, a polymerization terminating terminal, a main chain of the polymer and a side chain. However, it is preferably introduced into the polymerization terminating terminal in that the disappearance of energy from the polymer terminal is inhibited to be able to improve hysteresis loss characteristics.

Further, when the number of the alkoxysilyl groups bonded to the polymer chain is less than 0.1 mmol/kg of copolymer rubber polymer, the effect of introduction of the alkoxysilyl group comes not to appear. That is to say, improvements in hysteresis loss characteristics, wear resistance and the like of the resulting copolymer rubber are unfavorably insufficient. On the other hand, when it exceeds 200 mmol/kg of copolymer rubber polymer, interaction with a reinforcing agent such as carbon black or silica becomes too high. As a result, compounding viscosity increases to deteriorate processability.

Furthermore, when it has the amino group together with the alkoxysilyl group, the content of the amino group is usually from 0.1 to 200 mmol/kg of copolymer rubber polymer, preferably from 0.5 to 100 mmol/kg of copolymer rubber polymer, and more preferably from 1 to 50 mmol/kg of copolymer rubber polymer.

The amino group may be bonded to any of the polymerization initiating terminal, the polymerization terminating terminal, the main chain of the polymer and the side chain. However, it is preferably introduced into the polymerization initiating terminal or the polymerization terminating terminal in that the disappearance of energy from the polymer terminal is inhibited to be able to improve hysteresis loss characteristics.

Further, when the number of the amino groups bonded to the polymer chain is less than 0.1 mmol/kg of copolymer rubber polymer, the effect of introduction of the amino group comes not to appear. That is to say, improvements in hysteresis loss characteristics, wear resistance and the like of the resulting copolymer rubber are unfavorably insufficient. On the other hand, when it exceeds 200 mmol/kg of copolymer rubber polymer, interaction with the reinforcing agent such as carbon black or silica becomes too high. As a result, compounding viscosity increases to deteriorate processability.

The content of the above-mentioned alkoxysilyl group is easily adjustable by the amount of the (amino group-containing) alkoxysilane-based compound.

Further, the content of the above-mentioned amino group is easily adjustable by the amount of the (amino group-containing) alkoxysilane-based compound and/or the secondary amine compound or tertiary amine compound.

In the present invention, when a solvent is steam stripped from a solution of the resulting conjugated diolefin (co)polymer rubber to obtain a crumb-like rubber, desolvation is conducted under alkaline conditions.

In order to conduct desolvation in the present invention, there is preferred, for example, a method of adding a polymerization terminator to the solution of the (co)polymer rubber, and then adding the alkaline compound into the water to adjust the pH in the water during steam stripping to 8 to 12 (converted to 80° C.)

The above-mentioned method is a method of adding the polymerization terminator to the solution of the above-mentioned (co)polymer rubber, and then adding the alkaline compound into the water.

The pH range at the time of desolvation somewhat varies depending on the desolvation temperature, because the ion product of water varies depending on the temperature. When it is within the preferred range and moreover on the basis of 80° C. at which the pH is easily measurable, the pH at 80° C. at which desolvation is conducted is usually from 8 to 12, preferably from 9 to 11.5, and more preferably from 9.5 to 11. When the pH is less than 8, the alkalinity of the system is insufficient, and an increase in the Mooney viscosity of the resulting (co)polymer rubber with the elapse of time is unavoidable. On the other hand, when it exceeds 12, the alkalinity of the system becomes excessive, and an increase in the Mooney viscosity of the resulting (co)polymer rubber with the elapse of time can not be sufficiently restrained, so that this is unfavorable.

Desolvation is conducted at a temperature of usually 50 to 150° C., preferably 60 to 140° C., and more preferably 70 to 130° C.

Desolvation is conducted for a desolvation time of 10 minutes to 8 hours, preferably 30 minutes to 6 hours, and more preferably 1 to 4 hours.

The concentration of the crumb-like polymer dispersed in the water is generally from 0.1 to 30% by weight, preferably from 0.5 to 25% by weight, and more preferably from 2 to 20% by weight (the ratio to the water at the time of stripping), and within this range, a crumb having good particle size can be obtained without an operational obstacle.

The above-mentioned alkaline compounds include, for example, sodium nitrite, ammonia, aqueous ammonium hydroxide, ammonium hydrogen carbonate, sodium hydroxide, sodium silicate, sodium hydrogen carbonate, disodium carbonate, potassium hydroxide, calcium hydroxide, barium hydroxide, copper hydroxide, aluminum hydroxide, iron hydroxide, sodium aluminate, sodium sulfide, sodium thiosulfate, sodium sulfite, potassium carbonate, calcium nitrite, magnesium hydroxide, sodium pyrophosphate, sodium triphosphate, potassium pyrophosphate, lithium hydroxide and the like.

Of these, sodium hydroxide, ammonia, potassium hydroxide and lithium hydroxide are preferred.

The above-mentioned alkaline compounds can be used either alone or as a combination of two or more.

The pH at the time of steam stripping is from 8 to 12, preferably from 9 to 11.5, and more preferably from 9.5 to 11, on the basis of 80° C., as described above.

The amount of the alkaline compound added is such an amount that the pH at the time of steam stripping becomes 8 to 12. When the pH of the system is less than 8, the alkalinity of the system is insufficient, and an increase in the Mooney viscosity of the resulting (co)polymer rubber with the elapse of time is unavoidable. On the other hand, when it exceeds 12, the alkalinity of the system becomes excessive, and an increase in the Mooney viscosity of the resulting (co)polymer rubber with the elapse of time tends to be unable to be sufficiently restrained.

In the present invention, the pH (on the basis of 80° C.) of the system in which desolvation is conducted is from 8 to 12, preferably from 9 to 11.5, and more preferably from 9.5 to 11, as described above. The adjustment of the pH is performed by the addition of the alkaline compound as described above.

The present invention is not limited to adding the alkaline compound by the above-mentioned method, as long as the pH during steam stripping is adjusted to 8 to 12. However, the pH is preferably adjusted by adding the alkaline compound into water. In brief, the pH of the system during steam stripping is only required to be adjusted to 8 to 12, preferably 9 to 11.5, and more preferably to 9.5 to 11.

For example, a polymerization solution is poured into the water in which the pH has been adjusted to 8 to 12 with the above-mentioned alkaline compound, followed by steam stripping according to a conventional method.

The pH of the resulting (co)polymer rubber at the time of desolvation is shifted to the alkaline side thereby, so that, for example, the alkoxysilyl group bonded to the (co)polymer chain is difficult to be hydrolyzed or condensed, which makes it possible to restrain an increase in the Mooney viscosity with the elapse of time.

The weight average molecular weight of the (co)polymer rubber thus obtained is usually from 100,000 to 2,000,000, and preferably from 150,000 to 1,700,000. Less than 100,000 results in insufficient breaking strength, wear resistance, low hysteresis loss properties and the like of the resulting rubber composition, whereas exceeding 2,000,000 results in inferior processability, and in deterioration of filler dispersibility at the time of kneading, which causes deterioration of breaking strength, wear resistance, low hysteresis loss properties and wet-skid properties.

Further, the Mooney viscosity ($ML_{1+4}$, 100° C.) of the (co)polymer rubber obtained in the present invention is preferably within the range of 20 to 200. Less than 20 results in deterioration of breaking strength, wear resistance and low hysteresis loss properties, whereas exceeding 200 results in inferior processability.

A polymerization reaction solution containing the (co)polymer rubber obtained in the present invention is treated by a method which is used for an ordinary solution polymerization method. For example, after a stabilizer or the like has been added in a solution state, an extender oil such as an aromatic process oil or a naphthenic process oil, or a liquid polymer having a weight average molecular weight of 150,000 or less (or a solution of the above-mentioned liquid polymer) is added, and the rubber is separated from the solvent by the steam stripping method under the alkaline conditions and dried by a vacuum dryer, a hot air dryer, a roll or the like, thereby being able to isolate the desired (co)polymer rubber of the present invention.

In this case, there is provided the oil-extended (co)polymer rubber containing the extender oil in an amount of 10 to 100 parts by weight based on 100 parts by weight of the conjugated diolefin (co)polymer rubber of the present invention.

The (co)polymer rubber produced by the present invention may be used alone or blended with natural rubber, polyisoprene rubber, polybutadiene rubber, emulsion-polymerized styrene-butadiene rubber or the like, and then kneaded with the reinforcing agent such as carbon black or silica and various compounding agents by means of a roll or a Banbury mixer, followed by the addition of sulfur, a vulcanization accelerator or the like, thereby being able to use as a belt, a vibration-proof rubber or another industrial product, starting with a rubber for a tire such as a tread, a sidewall or a carcass.

When the (co)polymer rubber of the present invention is used as the tire, especially as the tire tread, the reinforcing agents with which the (co)polymer rubber is filled include, for example, fillers such as carbon black and silica.

In particular, when the vulcanizate is effectively reinforced to expect good wear resistance and breaking strength, carbon black is suitably used. The filling amount of carbon black is preferably from 20 to 120 parts by weight, and more preferably from 30 to 110 parts by weight, based on 100 parts by weight of all rubber components.

Further, particularly for the low fuel consumption tire application, the use of silica is preferred for the purpose of reducing the hysteresis loss of the vulcanizate to give good rolling resistance and to improve wet-skid resistance. The filling amount of the silica is preferably from 20 to 120 parts by weight, and more preferably from 30 to 110 parts by weight, based on 100 parts by weight of all rubber components.

Further, when silica is used as the filler, various known silane coupling agents can be used in order to increase its reinforcing effect. The silane coupling agent means a compound having both a constituent component reactable with the silica surface such as an alkoxysilyl group and a constituent component reactable with the rubber, particularly a carbon-carbon double bond, such as a polysulfide, a mercapto group or an epoxy group, in its molecule. For example, bis (3-triethoxysilylpropyl)-tetrasulfide, bis(3-triethoxysilylpropyl)disulfide, 3-mercaptopropyltrimethoxysilane and the like are well known as the silane coupling agents. When silica is used as the filler, it is desirable that the filler contains at least 1 part by weight of silica and further contains the silane coupling agent in an amount of 0.5 to 20% by weight based on the silica. This improves the dispersibility of the silica, and improves the binding ratio of the silica and the rubber, so that the effect of improving breaking strength, wear resistance and low hysteresis loss properties is obtained.

Furthermore, the use of carbon black and silica in combination within the range of 20 to 120 parts by weight based on 100 parts by weight of all rubber components also allows good wear resistance and breaking strength to be compatible with a balance between low hysteresis loss performance and wet grip performance.

In addition, a carbon-silica dual phase filler can be mixed with the (co)polymer rubber of the present invention, thereby being able to obtain excellent advantages similar to those obtained when the carbon black and the silica are used in combination therewith.

The carbon-silica dual phase filler is so-called silica coating carbon black in which silica is chemically bonded to the surface of carbon black and is sold from Cabot Corporation as CRX2000, CRX2002 or CRX2006 (trade name). The amount of the carbon-silica dual phase filler incorporated is preferably from 1 to 100 parts by weight, and more preferably from 5 to 95 parts by weight, based on 100 parts by weight of the total of the rubber components.

In the present invention, the carbon-silica dual phase filler can be used in combination with a filling agent other than that. The simultaneously usable filling agents include carbon black, silica, calcium carbonate and magnesium carbonate, but there is no limitation thereon. Carbon black and silica are preferred among others.

These simultaneously usable filling agents are incorporated preferably in an amount of 3 to 100 parts by weight, and particularly in an amount of 5 to 95 parts by weight, based on 100 parts by weight of the total amount of the rubber components.

In the rubber composition of the present invention, the vulcanizing agent can be used preferably within the range of 0.5 to 10 parts by weight, and more preferably within the range of 1 to 6 parts by weight, based on 100 parts by weight of all rubber components.

The vulcanizing agents include typically sulfur, and additionally a sulfur-containing compound, a peroxide and the like.

Further, the vulcanization accelerator such as a sulfenamide-based, guanidine-based or thiuram-based accelerator may be used in an amount according to need in combination with a vulcanizing agent. Furthermore, zinc white, a vulcanization auxiliary, an antiaging agent, a processing aid and the like may be used in an amount according to need.

In addition, various compounding agents for the rubber composition obtained using the (co)polymer rubber of the present invention are not particularly limited. However, compatibilizing agents, for example, an organic compound selected from an epoxy group-containing compound, a carboxylic acid compound, a carboxylic acid ester compound, a ketone compound, an ether compound, an aldehyde compound, a hydroxyl group-containing compound and an amino group-containing compound, or a silicone compound selected from an alkoxysilane compound, a siloxane compound and an aminosilane compound, as well as another extender oil and various compounding agents such as a vulcanizing agent, a vulcanization accelerator, zinc white, an antiaging agent, an antiscorching agent, a tackifier and another filler which are incorporated into an ordinary rubber composition, can also be added at the time of kneading, in order to improve processability at the time of kneading or to more improve a balance among wet-skid characteristics, low hysteresis loss and wear resistance.

EXAMPLES

The present invention will be illustrated in greater detail with reference to the following examples, but the invention should not be construed as being limited by these examples.

Parts and % are on the weight basis, unless otherwise specified.

Various measurements in the examples were made in accordance with the following methods.

(1) Vinyl Content of Conjugated Diolefin Moiety

The content was measured by 270-MHz, $^1$H-NMR.

(2) Bonded Styrene Content

The content was measured by 270-MHz, $^1$H-NMR.

(3) Weight Average Molecular Weight (Mw)

The molecular weight was measured in terms of polystyrene, using gel permeation chromatography (GPC) (HLC-8120 GPC manufactured by Tosoh Corporation).

(4) pH

The pH at 80° C. was measured by a glass electrode method, and when measured at a temperature other than 80° C., it was converted to the pH at 80° C.

(5) Mooney Viscosity ($ML_{1+4}$, 100° C.)

The Mooney viscosity was measured at a temperature of 100° C. with an L rotor, preheating for 1 minute with a rotor operation time of 4 minutes in accordance with JIS K6300.

(6) Evaluation of Heating Acceleration of Copolymer Rubber

A polymer rubber was allowed to stand in a thermostatic chamber having a temperature of 85° C. and a humidity of 90%, and the Mooney viscosities after 1 day and 3 days were measured (changes in the Mooney viscosity with the elapse of time were measured).

(7) Alkoxysilyl Group Content

A copolymer rubber was dissolved in toluene, and then, reprecipitation purification was performed twice in a large amount of methanol, followed by vacuum drying. Then, the alkoxysilyl group content was determined by the absorption at about 1,160 cm$^{-1}$ caused by a Si—C bond according to an infrared absorption spectrum.

(8) Primary Amino Group Content

A copolymer rubber was first dissolved in toluene, and then, reprecipitation purification was performed twice in a large amount of methanol to separate an amino group-containing compound not bonded to the copolymer rubber from the rubber, followed by vacuum drying. Using the copolymer rubber subjected to this treatment as a sample, the total amino group content was determined by the "total amine value test method" described in JIS K7237. Subsequently, using the copolymer rubber subjected to the above-mentioned treatment as a sample, the contents of secondary amino groups and tertiary amino groups were determined by the "acetylacetone blocked method". o-Nitrotoluene was used as a solvent for dissolving the sample, and acetylacetone was further added thereto. The potentiometric titration was conducted using a perchloric acetic acid solution. The primary amino group content was determined by subtracting the secondary amino group content and the tertiary amino group content from the total amino group content.

(9) Tertiary Amino Group Content

A copolymer rubber was first dissolved in toluene, and then, reprecipitation purification was performed twice in a large amount of methanol to separate an amino group-containing compound not bonded to the copolymer rubber from the rubber, followed by vacuum drying. Using the copolymer rubber subjected to this treatment as a sample, the tertiary amino group content was determined by the "acetylation method". o-Nitrotoluene and acetic acid were used as solvents for dissolving the sample, and a mixed solution of formic acid and acetic anhydride was added thereto. The potentiometric titration was conducted using a perchloric acid (acetic solution) to determine the content of tertiary amino groups.

(10) Evaluation of Physical Properties of Vulcanized Rubber

Using a copolymer rubber, kneading was performed in a 250-cc Labo Plastomill according to a compounding formulation shown in Table 3, and then, vulcanization was performed at 145° C. for a specific period of time. Using the resulting vulcanized rubber, various measurements of (a) to (c) described below were conducted.

(a) tan δ (0° C.)

tan δ was measured under conditions of a dynamic strain under tension of 0.1%, a frequency of 10 Hz and 0° C., using a dynamic spectrometer manufactured by Rheometrix (US). It is indicated by an index number, and a larger value shows larger and better wet-skid resistance.

(b) tan δ (70° C.)

tan δ was measured under conditions of a dynamic strain under tension of 1%, a frequency of 10 Hz and 70° C., using a dynamic spectrometer manufactured by Rheometrix (US). It is indicated by an index number, and a larger value shows lower and better rolling resistance.

(c) Lambourn Wear Index

Using a Lambourn type wear tester, the index was expressed as the amount of wear at a slip rate of 25%, and the measurement temperature was room temperature. A larger index shows better wear resistance.

Example 1

Production of Copolymer Rubber A

An autoclave reactor having an internal volume of 5 liters in which the atmosphere was replaced with nitrogen was charged with 2,500 g of cyclohexane, 25 g of tetrahydrofuran, 100 g of styrene, 390 g of 1,3-butadiene and 0.05 g of divinylbenzene. After the temperature of the contents of the reactor was adjusted to 10° C., 365 mg of n-butyllithium was added to initiate polymerization. The polymerization was conducted under adiabatic conditions, and the maximum temperature reached 85° C.

At the time when the polymerization conversion reached 99%, 10 g of 1,3-butadiene was added, followed by further polymerization for 1 minute. Then, 50 mg of tin tetrachloride was added, followed by stirring for 3 minutes. Thereafter, 2.98 mmol of N,N-bis(trimethylsilyl)aminopropylmethyldiethoxy-silane was added as a terminal modifier, and a modification reaction was conducted for 15 minutes, followed by the addition of 2,6-di-tert-butyl-p-cresol to obtain a polymer solution.

Then, the above-mentioned polymer solution was added to an aqueous solution adjusted to pH 8.5 (pH at 80° C., hereinafter the same) with ammonia as a pH adjuster, and desolvation was conducted by steam stripping at 95° C. for 2 hours. A rubber was dried with a hot roll controlled to 110° C. to obtain a copolymer rubber. The analytical values of the resulting copolymer rubber are shown in Table 1.

Example 2

Production of Copolymer Rubber B

A copolymer rubber was obtained in the same manner as with Example 1 with the exception that the aqueous solution adjusted to pH 8.5 with ammonia in Example 1 was changed to pH 9.5. The analytical values of the resulting copolymer rubber are shown in Table 1.

Example 3

Production of Copolymer Rubber C

A copolymer rubber was obtained in the same manner as with Example 2 with the exception that NaOH was added as the pH adjuster. The analytical values of the resulting copolymer rubber are shown in Table 1.

Example 4

Production of Copolymer Rubber D

A copolymer rubber was obtained in the same manner as with Example 3 with the exception that the aqueous solution adjusted to pH 9.5 with NaOH in Example 3 was changed to pH 10.5. The analytical values of the resulting copolymer rubber are shown in Table 1.

Example 5

Production of Copolymer Rubber E

A copolymer rubber was obtained in the same manner as with Example 4 with the exception that the aqueous solution adjusted to pH 10.5 with NaOH in Example 4 was changed to pH 11.5. The analytical values of the resulting copolymer rubber are shown in Table 1.

Example 6

Production of Copolymer Rubber F

A copolymer rubber was obtained in the same manner as with Example 3 with the exception that 1,324 mg of triethyl orthoformate was further added as an additive to the polymer solution obtained in Example 3. The analytical values of the resulting copolymer rubber are shown in Table 1.

Comparative Example 1

Production of Copolymer Rubber G

A copolymer rubber was obtained in the same manner as with Example 1 with the exception that sulfuric acid was added as the pH adjuster to adjust to pH 4. The analytical values of the resulting copolymer rubber are shown in Table 1.

Comparative Example 2

Production of Copolymer Rubber H

A copolymer rubber was obtained in the same manner as with Example 5 with the exception that the aqueous solution adjusted to pH 11.5 with NaOH in Example 5 was changed to pH 13. The analytical values of the resulting copolymer rubber are shown in Table 1.

Comparative Example 3

Production of Copolymer Rubber I

A copolymer rubber was obtained in the same manner as with Example 6 with the exception that no pH adjuster was added (pH 6.3). The analytical values of the resulting copolymer rubber are shown in Table 1.

Comparative Example 4

Production of Copolymer Rubber J

A copolymer rubber was obtained in the same manner as with Comparative Example 3 with the exception that no triethyl orthoformate was added as the additive. The analytical values of the resulting copolymer rubber are shown in Table 1.

Example 7

Production of Copolymer Rubber K

An autoclave reactor having an internal volume of 5 liters in which-the atmosphere was replaced with nitrogen was charged with 2,500 g of cyclohexane, 20 g of tetrahydrofuran, 180 g of styrene, 270 g of 1,3-butadiene and 0.05 g of divinylbenzene. After the temperature of the contents of the reactor was adjusted to 35° C., 255 mg of n-butyllithium was added to initiate polymerization. The polymerization was conducted under adiabatic conditions, and the maximum temperature reached 90° C.

At the time when the polymerization temperature reached 70° C., 40 g of 1,3-butadiene was added taking 8 minutes, and at the time when the polymerization conversion reached 99%, 10 g of 1,3-butadiene was added, followed by further polymerization for 1 minute. Then, 3.18 mmol of methyltriphenoxysilane was added as a terminal modifier, and a modification reaction was conducted for 15 minutes. Then, 2,6-di-tert-butyl-p-cresol was added to a polymer solution after the reaction, and 187.5 g (37.5 parts based on 100 weight units of rubber) of an extender oil (manufactured by Fuji Kosan Co., Ltd., trade name: "Fukkol Aroma #3") was further added to obtain a polymer solution.

Then, the above-mentioned polymer solution was added to an aqueous solution adjusted to pH 10.5 with LiOH as a pH adjuster, and desolvation was conducted by steam stripping at 95° C. for 2 hours. A rubber was dried with a hot roll controlled to 110° C. to obtain a copolymer rubber. The analytical values of the resulting copolymer rubber are shown in Table 1.

Comparative Example 5

Production of Copolymer Rubber L

A copolymer rubber was obtained in the same manner as with Example 7 with the exception that no pH adjuster was added (pH 6.3). The analytical values of the resulting copolymer rubber are shown in Table 1.

Example 8

Production of Copolymer Rubber M

An autoclave reactor having an internal volume of 5 liters in which the atmosphere was replaced with nitrogen was charged with 2,500 g of cyclohexane, 100 g of tetrahydrofuran, 130 g of styrene, 360 g of 1,3-butadiene, 0.05 g of divinylbenzene and 230 mg of piperidine. After the temperature of the contents of the reactor was adjusted to 20° C., 255 mg of n-butyllithium was added to initiate polymerization. The polymerization was conducted under adiabatic conditions, and the maximum temperature reached 85° C.

At the time when the polymerization conversion reached 99%, 10 g of 1,3-butadiene was added, followed by further polymerization for 1 minute. Then, 3.18 mmol of methyltriphenoxysilane was added as a terminal modifier, and a modification reaction was conducted for 15 minutes. Then, 2,6-di-tert-butyl-p-cresol was added to a polymer solution after the reaction, and 187.5 g (37.5 parts based on 100 weight units of rubber) of an extender oil (manufactured by Fuji Kosan Co., Ltd., "TDAE") was further added to obtain a polymer solution.

Then, the above-mentioned polymer solution was added to an aqueous solution adjusted to pH 10.5 with KOH as a pH adjuster, and desolvation was conducted by steam stripping at 95° C. for 2 hours. A rubber was dried with a hot roll controlled to 110° C. to obtain a copolymer rubber. The analytical values of the resulting copolymer rubber are shown in Table 1.

Comparative Example 6

Production of Copolymer Rubber N

A copolymer rubber was obtained in the same manner as with Example 8 with the exception that no pH adjuster was added (pH 6.3). The analytical values of the resulting copolymer rubber are shown in Table 1.

Example 9

Production of Copolymer Rubber D'

The copolymer rubber obtained in Example 4 was allowed to stand for 3 days in a thermostatic chamber adjusted to a temperature of 85° C. and a humidity of 90% to obtain a copolymer rubber. A compounded rubber prepared according to a compounding formulation shown in Table 3 using the resulting copolymer rubber was vulcanized, and the physical properties were evaluated. The results thereof are shown in Table 4.

Comparative Example 7

Production of Copolymer Rubber G'

The copolymer rubber obtained in Comparative Example 1 was allowed to stand for 3 days in a thermostatic chamber adjusted to a temperature of 85° C. and a humidity of 90% to obtain a copolymer rubber. A compounded rubber prepared according to a compounding formulation shown in Table 3 using the resulting copolymer rubber was vulcanized, and the physical properties were evaluated. The results thereof are shown in Table 4.

Using the copolymer rubbers of Examples 1 to 8 and Comparative Examples 1 to 6, tests of stability with time were performed. That is to say, the copolymer rubbers were allowed to stand for 3 days in a thermostatic chamber adjusted to a temperature of 85° C. and a humidity of 90%, and it was determined from changes in the Mooney viscosity ($ML_{1+4}$, 100° C.) between after one day and after 3 days whether the Mooney viscosity changed with the elapse of time or not, thereby evaluating stability of the Mooney viscosity. The test results are shown in Table 2.

From the results of Examples 1 to 8 and Comparative Examples 1 to 6, it is known that the Mooney viscosity is stable in a high pH region within the range of pH 8 to 12. Further, from the results of Example 6 and Comparative Example 3, it is also the same in the case in which triethyl orthoformate was added.

From the results of Example 9 and Comparative Example 7, it is known that the compounded rubber vulcanizate using the copolymer rubber (copolymer rubber D') having good stability with the elapse of time is better in tan δ (0° C.), tan δ (70° C.) and wear resistance.

TABLE 1

| | Structure of Copolymer Rubber etc. | | | | | |
|---|---|---|---|---|---|---|
| | Copolymer Rubber | Initiator | Terminal Modifier | Alkoxysilyl Group Content (mmol/kg) | Primary Amino Group Content (mmol/kg) | Tertiary Amino Group Content (mmol/kg) |
| Example 1 | A | n-BuLi | (Note 1) | 4.7 | 4.6 | — |
| Example 2 | B | n-BuLi | (Note 1) | 4.7 | 4.6 | — |
| Example 3 | C | n-BuLi | (Note 1) | 4.8 | 4.6 | — |
| Example 4 | D | n-BuLi | (Note 1) | 4.8 | 4.6 | — |
| Example 5 | E | n-BuLi | (Note 1) | 4.8 | 4.6 | — |
| Example 6 | F | n-BuLi | (Note 1) | 4.7 | 4.5 | — |
| Comparative Example 1 | G | n-BuLi | (Note 1) | 4.8 | 4.5 | — |
| Comparative Example 2 | H | n-BuLi | (Note 1) | 4.8 | 4.5 | — |
| Comparative Example 3 | I | n-BuLi | (Note 1) | 4.7 | 4.5 | — |
| Comparative Example 4 | J | n-BuLi | (Note 1) | 4.8 | 4.5 | — |
| Example 7 | K | n-BuLi | Methyltriphenoxysilane | 5.7 | — | — |
| Comparative Example 5 | L | n-BuLi | Methyltriphenoxysilane | 5.7 | — | — |
| Example 8 | M | Piperidine-Li | Methyltriphenoxysilane | 5.9 | — | 4.6 |
| Comparative Example 6 | N | Piperidine-Li | Methyltriphenoxysilane | 5.9 | — | 4.6 |

| | Structure of Copolymer Rubber etc. | | | | |
|---|---|---|---|---|---|
| | Vinyl Content (%) | Styrene Content (%) | Weight Average Molecular Weight (10,000) | Mooney Viscosity of Raw Rubber | Mooney Viscosity (Oil Extended) |
| Example 1 | 54 | 20 | 39 | 45 | — |
| Example 2 | 54 | 20 | 39 | 45 | — |
| Example 3 | 55 | 21 | 38 | 44 | — |
| Example 4 | 55 | 21 | 38 | 44 | — |
| Example 5 | 55 | 21 | 38 | 44 | — |
| Example 6 | 56 | 21 | 38 | 45 | — |
| Comparative Example 1 | 54 | 20 | 39 | 47 | — |
| Comparative Example 2 | 54 | 20 | 39 | 46 | — |
| Comparative Example 3 | 56 | 21 | 38 | 45 | — |
| Comparative Example 4 | 54 | 20 | 39 | 46 | — |
| Example 7 | 41 | 36 | 66 | — | 42 |
| Comparative Example 5 | 41 | 36 | 66 | — | 43 |
| Example 8 | 64 | 26 | 64 | — | 40 |
| Comparative Example 6 | 64 | 26 | 64 | — | 42 |

Note (1): N,N-bis(trimethylsilyl)aminopropylmethyldiethoxysilane
n-BuLi: n-butyllithium

TABLE 2

| | Copolymer Rubber | Desolvation Conditions | | | Mooney Viscosity Just after Drying (ML$_{1+4}$, 100° C.) | Heating Acceleration Evaluation Mooney Viscosity | |
|---|---|---|---|---|---|---|---|
| | | PH Adjuster | Additive | pH | | After 1 Day | After 3 Days |
| Example 1 | A | NH$_3$ | — | 8.5 | 45 | 47 | 53 |
| Example 2 | B | NH$_3$ | — | 9.5 | 45 | 47 | 51 |
| Example 3 | C | NaOH | — | 9.5 | 44 | 45 | 49 |
| Example 4 | D | NaOH | — | 10.5 | 44 | 44 | 44 |
| Example 5 | E | NaOH | — | 11.5 | 44 | 44 | 45 |
| Example 6 | F | NaOH | Triethyl orthoformate | 9.5 | 45 | 46 | 49 |
| Comparative Example 1 | G | H$_2$SO$_4$ | — | 4.0 | 47 | 54 | 63 |
| Comparative Example 2 | H | NaOH | — | 13.0 | 46 | 50 | 59 |
| Comparative Example 3 | I | — | Triethyl orthoformate | 6.3 | 45 | 49 | 56 |
| Comparative Example 4 | J | — | — | 6.3 | 46 | 50 | 59 |
| Example 7 | K | LiOH | — | 10.5 | 42 | 42 | 43 |
| Comparative Example 5 | L | — | — | 6.3 | 43 | 46 | 53 |
| Example 8 | M | KOH | — | 10.5 | 40 | 40 | 40 |
| Comparative Example 6 | N | — | — | 6.3 | 42 | 46 | 55 |

TABLE 3

| Compounding Component | Parts |
|---|---|
| Butadiene Rubber (1) | 30 |
| (Co)polymer Rubber or (Co)polymer Rubber Composition (2) | 70 |
| Aromatic Extender Oil (3) | 37.5 |
| Silica (4) | 60 |
| Carbon Black (5) | 15 |
| Silane Coupling Agent (6) | 3 |
| Stearic Acid | 2 |
| Zinc Oxide | 3 |
| Antiaging Agent (7) | 1 |
| Vulcanization Accelerator (8) | 1 |
| Vulcanization Accelerator (9) | 1.5 |
| Sulfur | 1.5 |

(Description of Table 3)
(1) BR01 manufactured by JSR Corporation
(2) When a (co)polymer rubber previously oil-extended is used, the amount of the (co)polymer rubber is indicated as the amount of only a rubber portion obtained by removing extender oil components from the oil-extended (co)polymer rubber.
(3) Fukkol Aroma #3 manufactured by Fuji Kosan Co., Ltd. When a copolymer rubber previously oil-extended is used, the amount of the extender oil is indicated as the total amount of an extender oil contained in the oil-extended (co)polymer rubber and an extender oil additionally added in kneading.
(4) Nipsil AQ manufactured by Nippon Silica Industrial Co., Ltd.
(5) Seast KH manufactured by Tokai Carbon Co., Ltd.
(6) Si69 manufactured by Degussa AG Material name: bis(3-triethoxysilylpropyl)tetrasulfide
(7) NOCRAC 810Na manufactured by Ouchishinko Chemical Industrial Co., Ltd Material name: N-phenyl-N'-isopropyl-p-phenylenediamine
(8) NOCCELER CZ manufactured by Ouchishinko Chemical Industrial Co., Ltd. Material name: N-cyclohexane-2-benzothiazolesulfen amide
(9) NOCCELER D manufactured by Ouchishinko Chemical Industrial Co., Ltd. Material name: diphenylguanidine

TABLE 4

| | Copolymer Rubber | tan δ (0° C.) (index) | tan δ (70° C.) (index) | Wear Resistance (index) |
|---|---|---|---|---|
| Example 9 | D' | 100 | 105 | 103 |
| Comparative Example 7 | G' | 100 | 100 | 100 |

INDUSTRIAL APPLICABILITY

According to the present invention, there can be provided a conjugated diolefin (co)polymer rubber having an alkoxysilyl group which is small in variations in the Mooney viscosity of the rubber and can be stably produced, and in which later changes in the Mooney viscosity with the elapse of time can also be restrained.

Accordingly, the conjugated diolefin (co)polymer rubber of the present invention ensures quality stability particularly even when stored for a long period of time, improves a balance of tan δ (0° C.) /tan δ (70° C.) at the time when used in a compounded rubber vulcanizate, and is also useful in that it is also excellent in wear resistance.

The invention claimed is:

1. A method for producing an alkoxysilyl group containing conjugated diolefin (co)polymer rubber from a conjugated diolefin or a conjugated diolefin and an aromatic vinyl compound, wherein said (co)polymer rubber has an alkoxysilyl group and has been desolvated under alkaline conditions, comprising polymerizing a conjugated diolefin or a conjugated diolefin and an aromatic vinyl compound in a hydrocarbon solvent by anionic polymerization using as an initiator at least one metal compound selected from the group consisting of an organic alkali metal compound and an organic alkali earth metal compound, and then allowing an alkoxysilane-based compound to react, wherein after said alkoxysilane-based compound has been allowed to react, an alkaline compound is added at the time of desolvation, and treatment is conducted at a pH of 8 to 12.

2. The method according to claim 1, wherein the (co)polymer rubber further comprises an amino group.

3. The method according to claim 2, wherein the amino group is a primary amino group.

4. The method according to claim 2, wherein an amino group-containing alkoxysilane-based compound is used as a compound for allowing the amino group and the alkoxysilyl group to be bonded to a (co)polymer chain.

5. The method according to claim 3, wherein an amino group-containing alkoxysilane-based compound is used as a compound for allowing the amino group and the alkoxysilyl group to be bonded to a (co)polymer chain.

6. A method for producing the alkoxysilyl group-containing conjugated diolefin (co)polymer rubber according to claim 1, wherein the alkaline compound is at least one selected from the group consisting of ammonia, sodium hydroxide, potassium hydroxide and lithium hydroxide.

7. A method for producing the alkoxysilyl group-containing conjugated diolefin (co)polymer rubber according to claim 1, wherein the hydrocarbon solvent is selected from the group consisting of pentane, hexane, heptane, octane, methylcyclopentane, cyclohexane, benzene, toluene, and xylene and is present in such an amount as to give a total monomer concentration of 5 to 30% by weight.

8. A method for producing the alkoxysilyl group-containing conjugated diolefin (co)polymer rubber according to claim 1, wherein the conjugated diolefin is selected from the group consisting of 1,3-butadiene, isoprene, 2,3-dimethyl-1,3-butadiene, 2-chloro-1,3-butadiene, 1,3-pentadiene, and mixtures thereof.

9. A method for producing the alkoxysilyl group-containing conjugated diolefin (co)polymer rubber according to claim 8, comprising polymerizing a conjugated diolefin and an aromatic vinyl compound wherein the aromatic vinyl compound is selected from the group consisting of styrene, 2-methylstyrene, 3-methylstyrene, 4-methylstyrene, .alpha.-methylstyrene, 2,4-dimethylstyrene, 2,4-diisopropylstyrene, 4-tert-butylstyrene, divinylbenzene, tert-butoxystyrene, vinylbenzyldimethylamine, (4-vinyl-benzyl)dimethylaminoethyl ether, N,N-dimethylaminoethyl-styrene, 2-t-butylstyrene, 3-t-butylstyrene, 4-t-butyl-styrene, vinylpyridine, and mixtures thereof.

10. A method for producing the alkoxysilyl group-containing conjugated diolefin (co)polymer rubber according to claim 1, wherein the organic alkali metals and organic alkali earth metals are selected from the group consisting of n-butyllithium, sec-butyllithium and t-butyllithium, 1,4-dilithiobutane, phenyllithium, stilbenelithium, lithiumnaphthalene, sodiumnaphthalene, potassiumnaphthalene, n-butylmagnesium, n-hexylmagnesium, ethoxycalcium, calcium stearate, t-butoxystrontium, ethoxybarium, isopropoxybarium, ethylmercaptobarium, t-butoxybarium, phenoxybarium, di-ethylaminobarium and barium stearate.

11. A method for producing the alkoxysilyl group-containing conjugated diolefin (co)polymer rubber according to claim 1, wherein the alkoxysilane-based compound is selected from the group consisting of tetramethoxysilane, tetraethoxysilane, tetrapropoxysilane, tetrabutoxysilane, tetraphenoxysilane, tetratoluyloxysilane, methyltrimethoxysilane, methyltriethoxysilane, methyltripropoxysilane, methyltributoxysilane, methyltriphenoxysilane, ethyltrimethoxysilane, ethyltriethoxysilane, ethyltripropoxysilane, ethyltributoxysilane, ethyltriphenoxysilane, dimethyldimethoxysilane, dimethyldiethoxysilane, dimethyldipropoxysilane, dimethyldibutoxysilane, dimethyldiphenoxysilane, diethyldimethoxysilane, diethyldiethoxysilane, diethyldipropoxysilane, diethyldibutoxysilane, diethyldiphenoxysilane, vinyltrimethoxysilane, vinyltriethoxysilane, vinyltripropoxysilane, vinyltri-butoxysilane, vinyltriphenoxysilane, allyltriphenoxysilane, octenyltrimethoxysilane, phenyltrimethoxysilane, phenyltriethoxysilane, phenyltripropoxysilane, phenyltributoxysilane, phenyltriphenoxysilane, trimethoxychlorosilane, triethoxychlorosilane, tripropoxychlorosilane, tributoxychlorosilane, triphenoxychlorosilane, dimethoxydichlorosilane, dipropoxydichlorosilane and diphenoxydichlorosilane.

12. A method for producing the alkoxysilyl group-containing conjugated diolefin (co)polymer rubber according to claim 4, wherein the amino group-containing alkoxysilane-based compound is selected from the group consisting of N,N-bis (trimethylsilyl)amino-propylmethyldimethoxysilane, N,N-bis(trimethylsilyl)amino-propylmethyldiethoxysilane, N,N-bis(trimethylsilyl)amino-propyltrimethoxysilane, N,N-bis(trimethylsilyl)aminopropyltriethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, N,N-bis(trimethylsilyl)aminoethylmethyldiethoxysilane,
1-trimethylsilyl-2,2-dimethoxy-1-aza-2-sila-cyclopentane, N,N-diethyl-3-aminopropyltrimethoxysilane, N,N-diethyl-3-aminopropyltriethoxysilane, 2-(triethoxy-silylethyl)pyridine, and γ-isocyanatepropyltriethoxysilane.

13. A method for producing the alkoxysilyl group-containing conjugated diolefin (co)polymer rubber according to claim 1, wherein the weight average molecular weight of the (co)polymer rubber is 150,000 to 1,700,000 and the Mooney viscosity of the (co)polymer rubber is 20 to 200.

* * * * *